United States Patent
Ikeda

(10) Patent No.: US 12,086,330 B2
(45) Date of Patent: Sep. 10, 2024

(54) INFORMATION PROCESSING DEVICE, INFORMATION PROCESSING SYSTEM, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Kouji Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/302,019

(22) Filed: Apr. 18, 2023

(65) Prior Publication Data

US 2023/0367402 A1 Nov. 16, 2023

(30) Foreign Application Priority Data

May 16, 2022 (JP) ................... 2022-080032

(51) Int. Cl.
G06F 3/03 (2006.01)
G06F 3/01 (2006.01)
G06F 3/0346 (2013.01)

(52) U.S. Cl.
CPC ............ *G06F 3/0308* (2013.01); *G06F 3/012* (2013.01); *G06F 3/014* (2013.01); *G06F 3/0346* (2013.01)

(58) Field of Classification Search
CPC ........ G06F 3/0308; G06F 3/012; G06F 3/014; G06F 3/0346; G06F 3/011; G06F 3/04842; G02B 2027/014
See application file for complete search history.

(56) References Cited

U.S. PATENT DOCUMENTS

| | | | |
|---|---|---|---|
| 9,047,698 B2 | 6/2015 | Maciocci | |
| 10,537,795 B2 | 1/2020 | Bristol | |
| 11,347,303 B2 | 5/2022 | Stafford | |
| 2021/0318759 A1* | 10/2021 | Erivantcev | H04B 1/385 |
| 2022/0026981 A1* | 1/2022 | Fukumoto | G02B 27/0101 |

FOREIGN PATENT DOCUMENTS

| | | |
|---|---|---|
| JP | 2014-514652 A | 6/2014 |
| JP | 2020-519992 A | 7/2020 |

* cited by examiner

*Primary Examiner* — Towfiq Elahi
(74) *Attorney, Agent, or Firm* — Carter, DeLuca & Farrell LLP

(57) ABSTRACT

An information processing device includes: an acquisition unit that acquires inertial information from an inertial sensor provided in a controller; a detection unit that detects the controller from a captured image acquired through imaging by an imaging device; and a control unit that acquires a position of the controller on a basis of a position of the controller acquired in a past and the inertial information in a case where the controller is not detected from the captured image. The control unit controls a display to display a display item at a position based on the acquired position of the controller.

15 Claims, 8 Drawing Sheets

INFORMATION PROCESSING DEVICE, INFORMATION PROCESSING SYSTEM, INFORMATION PROCESSING METHOD, AND NON-TRANSITORY COMPUTER READABLE MEDIUM

BACKGROUND OF THE INVENTION

Field of the Invention

The present invention relates to an information processing device, an information processing system, an information processing method, and a non-transitory computer readable medium.

Description of the Related Art

Conventionally, in a cross reality (XR) system for making a user physically feel virtual reality, a hand controller is used to convert the movement of a hand into an operation in a virtual space at the time of controlling the display of a head-mounted display (HMD). The HMD is a glasses-type device including a small display attached to the head of a user.

Japanese Patent Application Laid-open No. 2020-519992 proposes a hand controller that causes a plurality of infrared light (IR light) beams to be emitted from a hand controller so that a camera mounted in an HMD is enabled to receive the infrared light, thereby detecting the position and attitude (orientation) of a hand.

Further, Japanese Patent Application Laid-open No. 2014-514652 proposes a device that compares a body portion of a user reflected in a captured image of a camera installed in an HMD with a bone model stored in a memory, thereby reflecting the position and attitude of the user in a virtual space.

However, the technology disclosed in Japanese Patent Application Laid-open No. 2020-519992 requires the mounting of a plurality of light-emitting diodes in the hand controller to detect the position and attitude of the hand controller, and therefore the miniaturization of the hand controller becomes difficult. Further, the technology disclosed in Japanese Patent Application Laid-open No. 2014-514652 has a problem of reduced detection accuracy depending on the direction of the hand of a user.

SUMMARY OF THE INVENTION

In view of the above problems, the present invention has an object of providing technology of making it possible to accurately acquire the position of a hand of a user on the basis of information on a controller even if the controller held by the hand of the user is small.

An aspect of the invention is an information processing device including at least one memory and at least one processor which function as: an acquisition unit configured to acquire inertial information from an inertial sensor provided in a controller; a detection unit that configured to detect the controller from a captured image acquired through imaging by an imaging device; and a control unit configured to 1) acquire a position of the controller on a basis of a position of the controller acquired in a past and the inertial information in a case where the controller is not detected from the captured image, and 2) control a display to display a display item at a position based on the acquired position of the controller.

An aspect of the invention is an information processing method including: acquiring inertial information from an inertial sensor provided in a controller; detecting the controller from a captured image acquired through imaging by an imaging device; and 1) acquiring a position of the controller on a basis of a position of the controller acquired in a past and the inertial information in a case where the controller is not detected from the captured image, and 2) controlling a display to display a display item at a position based on the acquired position of the controller.

Further features of the present invention will become apparent from the following description of exemplary embodiments with reference to the attached drawings.

DESCRIPTION OF THE EMBODIMENTS

Hereinafter, preferred embodiments of the present invention will be described in detail on the basis of the accompanying drawings.

First Embodiment

Figure 1:
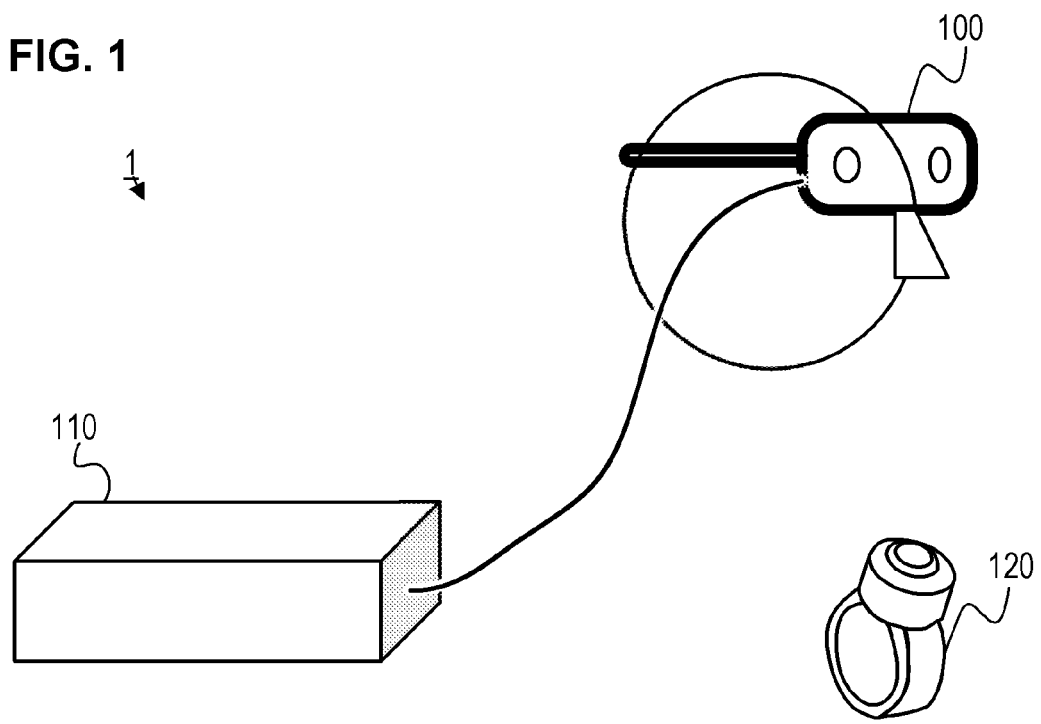
FIG. 1 is a diagram for describing an information processing system according to a first embodiment.

With reference to FIG. 1, an information processing system 1 according to a first embodiment will be described. The information processing system 1 has an HMD 100, an image processing device 110, and a controller 120.

The HMD 100 is a head-mounted-type display device (electronic equipment) attachable to the head of a user. On the HMD 100, a combined image in which an image of a range in front of the user captured by the HMD 100 and a content such as a CG (Computer Graphic) of an appearance corresponding to the attitude (orientation) of the HMD 100 are combined together is displayed.

The image processing device 110 is a control device (an information processing device; electronic equipment) that controls the HMD 100. The image processing device 110 is, for example, a smart phone, a tablet terminal, or a PC (Personal Computer). The image processing device 110 is connected to the HMD 100 in a wireless or wired fashion. The image processing device 110 generates a combined image by combining a captured image with a CG and transmits the combined image to the HMD 100. Note that the respective configurations of the image processing device 110 may be provided in the HMD 100.

The controller 120 is a device for performing the various control of the HMD 100. When the image processing device 110 is in a specific control mode, the HMD 100 is controlled according to the operation of a user as the user performs the operation on the controller 120. As shown in FIG. 1, the controller 120 has, for example, a ring shape so as to be attachable to a finger of the user. When the controller 120 is attachable to a finger of the user, the user is enabled to freely move a hand while holding the controller 120. Further, the controller 120 has a button in which an "optical track pad (hereinafter called and "OTP") capable of detecting a planar movement amount" is embedded. The controller 120 performs wireless communication with the image processing device 110 through Bluetooth.

The user causes a menu including a pointer to be displayed on the HMD 100 by, for example, pressing the button of the OTP for a long time. After that, the user is enabled to adjust the pointer to a desired item by putting a finger on the OTP and rubbing the OTP in any direction. Further, the user is enabled to perform a determination operation to determine the selection of the item by thrusting the OTP button. Note that the shape of the controller 120 is described as a ring shape but is not limited to the ring shape. For example, the shape of the controller 120 may be a shape such as a grove type attachable to a hand. As described above, the controller 120 may have a shape capable of being held by a hand of the user or attachable to the hand so as to be easily used by the user.

Internal Configurations of HMD

Figure 2:
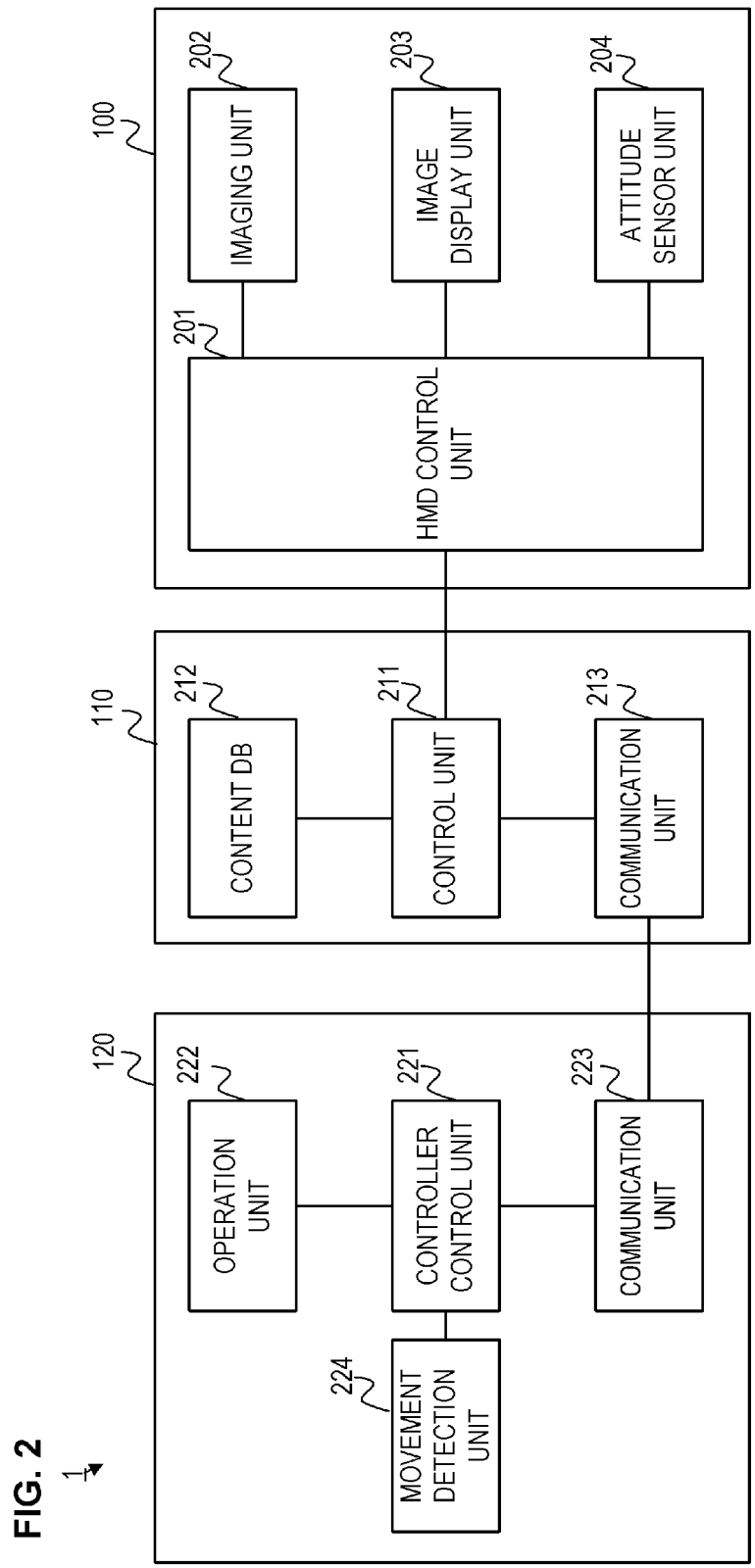
FIG. 2 is a diagram for describing the internal configurations or the like of an HMD according to the first embodiment.

The internal configurations of the HMD 100 will be described with reference to FIG. 2. The HMD 100 has an HMD control unit 201, an imaging unit 202, an image display unit 203, and an attitude sensor unit 204.

The HMD control unit 201 controls the respective configurations of the HMD 100. When acquiring a combined image (an image in which an image of a space in front of a user captured by the imaging unit 202 and a CG are combined together) from the image processing device 110, the HMD control unit 201 displays the combined image on the image display unit 203. Therefore, the user is enabled to see the combined image displayed on the image display unit 203 with the HMD 100 attached to the user. The user is enabled to experience various mixed realities such as one in which a CG is merged with a reality space.

The imaging unit 202 includes two cameras (imaging devices). In order to capture an image of the same space as a space seen by the user at a normal time, the two cameras are arranged near the positions of the right and left eyes of the user when the HMD 100 is attached to the user. Images (captured images) of a subject (a range in front of the user) captured by the two cameras are output to the image processing device 110. Further, the two cameras of the imaging unit 202 are enabled to acquire information on distances from the two cameras to a subject as distance information by ranging based on stereo cameras.

The image display unit 203 displays a combined image. The image display unit 203 has, for example, a liquid-crystal panel, an organic EL panel, or the like. In a state in which the HMD 100 is attached to the user, an organic EL panel is disposed in front of each of the eyes of the user.

Note that it is also possible to use a device with a semi-transparent half mirror in the image display unit 203. In this case, for example, the image display unit 203 may display an image as if a CG were directly superimposed on a "reality space seen through the half mirror" by a technology generally called AR. Further, the image display unit 203 may display an image in a perfect virtual space without using a captured image by a technology generally called VR.

The attitude sensor unit 204 detects the attitude and position of the HMD 100. The attitude sensor unit 204 has an IMU (Inertial Measurement Unit). The attitude sensor unit 204 outputs information on the attitude of the HMD 100 to the image processing device 110 as attitude information.

Internal Configurations of Image Processing Device

The internal configurations of the image processing device 110 will be described with reference to FIG. 2. The image processing device 110 has a control unit 211, a content DB 212, and a communication unit 213.

The control unit 211 receives "an image (captured image) acquired by the imaging unit 202 and attitude information acquired by the attitude sensor unit 204" from the HMD 100. The control unit 211 performs image processing to cancel the aberration between the optical system of the imaging unit 202 and the optical system of the image display unit 203 on the captured image. Then, the control unit 211 combines the captured image with any CG to generate a combined image. The control unit 211 transmits the combined image to the HMD control unit 201 in the HMD 100.

Note that the control unit 211 controls the position, direction, and size of a CG in a combined image on the basis of information (distance information and attitude information) acquired by the HMD 100. For example, when arranging a virtual object shown by a CG near a specific object existing in a reality space in a space expressed by a combined image, the control unit 211 controls the virtual object (CG) to be made larger if the distance between the specific object and the imaging unit 202 is shorter. By controlling the position, direction, and size of a CG like this, the control unit 211 is enabled to generate a combined image as if a CG object not arranged in a reality space were arranged in the reality space.

The content DB 212 is a storage unit that stores information such as a CG. Note that the control unit 211 is capable of switching a CG (that is, a CG used to generate a combined image) read from the content DB 212.

Internal Configurations of Controller

The internal configurations of the controller 120 will be described with reference to FIG. 2. The controller 120 has a controller control unit 221, an operation unit 222, a communication unit 223, and a movement detection unit 224. Here, a plurality of light-emitting diodes (such as large sensors) as shown in Japanese Patent Application Laid-open No. 2020-519992 are not required to be mounted in the controller 120. Therefore, the miniaturization of the controller 120 is made possible.

The controller control unit 221 controls the respective configurations of the controller 120.

The operation unit 222 includes a button in which an OTP is embedded. Information (operation information) on pressing or sliding by a finger with respect to the OTP in the operation unit 222 is transmitted to the image processing device 110 via the communication unit 223.

For example, a user is enabled to move a pointer displayed on the HMD 100 to a predetermined position by sliding a finger on the OTP. Further, the user is enabled to give instructions to perform specific processing to the HMD 100 or the image processing device 110 by pressing the button of the OTP. As described above, the user is enabled to control the HMD 100 by a combination of the sliding of a finger and the pressing of the button on the OTP. More specifically, the user is enabled to select a position by, for example, pressing the button of the OTP for a long time to display a menu on the HMD 100 and thrusting the button of the OTP after adjusting a pointer to the desired position.

The operation unit 222 may include any operation member instead of the OTP so long as the user is capable of operating the operation member with physical contact. For example, the operation unit 222 may include any of a touch pad, a touch panel, a cross key, a joy stick, and a track pad device instead of the OTP.

The communication unit 223 performs wireless communication with the image processing device 110 (the communication unit 213).

The movement detection unit 224 has an IMU (an Inertial Measurement Unit; an inertial sensor) enabled to detect inertial information (a spatial movement amount or an angle) on the controller 120. Note that the movement detection unit 224 may have any device so long as the device does not hinder the miniaturization of the controller 120 and is enabled to detect inertial information (information such as a change in position, a speed, and acceleration).

Ray Display Processing

Figure 3:
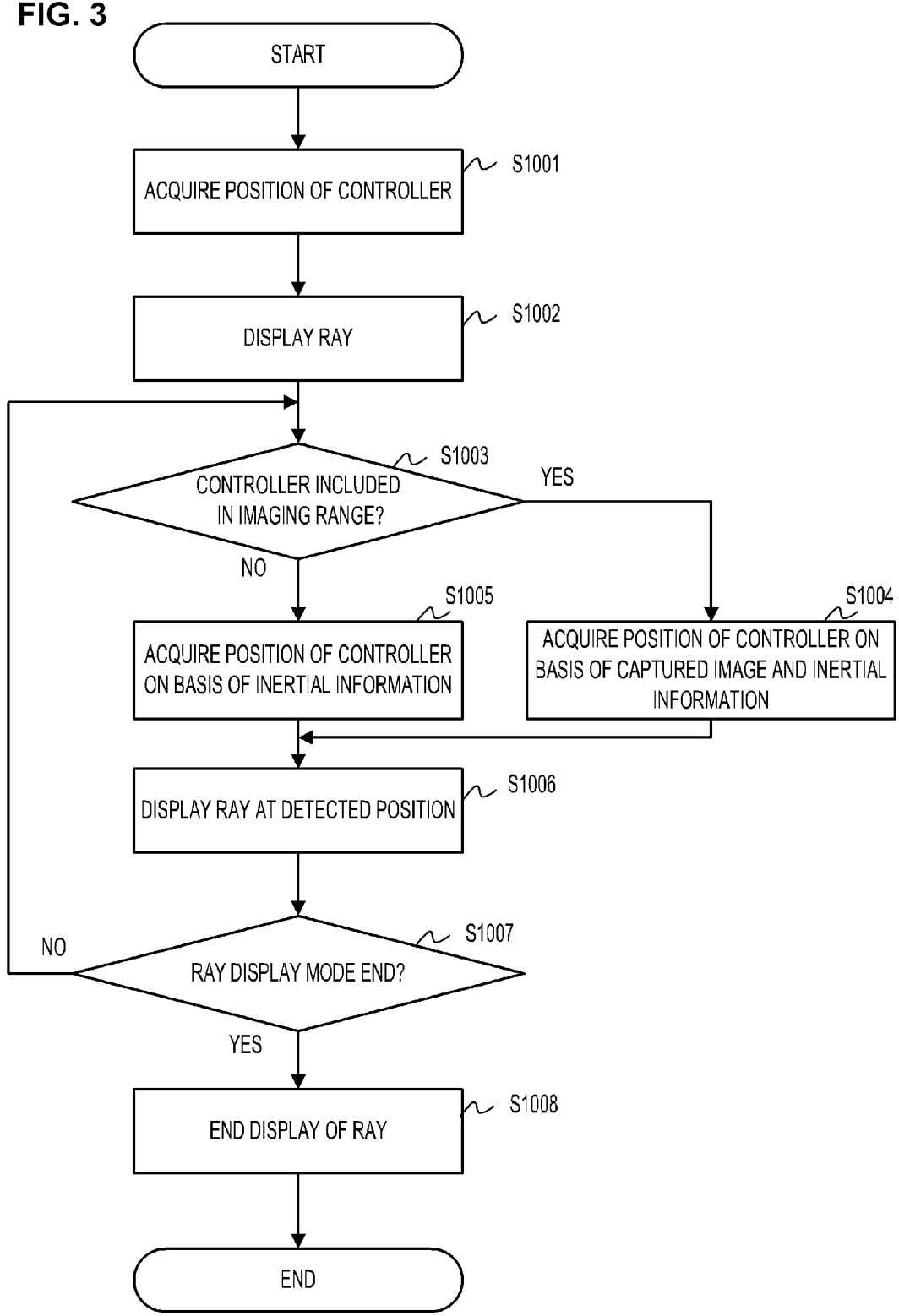
FIG. 3 is a flowchart of ray display processing according to the first embodiment.

With reference to the flowchart of FIG. 3, processing for displaying a ray that is a light display item indicating a position will be described. For example, in FIG. 4, a ray 403 is light extending from a hand 402 to a plurality of windows 401 in a combined image. The ray 403 indicates the position of a window C.

It is assumed that the operation mode of the image processing device 110 has been set to a mode (ray display mode) in which a ray is displayed on the HMD 100 before the processing of the flowchart starts. Further, when the controller 120 is included in the imaging range (detection range) of the imaging unit 202 and the imaging unit 202 captures an image of the controller 120, the processing of the flowchart starts. The expression "the controller 120 is included in the imaging range (detection range) of the imaging unit 202" represents that the controller 120 is detectable from a captured image (at least any of two captured images acquired by the imaging of the two cameras).

In step S1001, the control unit 211 detects the controller 120 from the captured image in which the controller 120 is captured and analyzes the captured image to acquire the position of the controller 120. Specifically, the control unit 211 converts the position of the controller 120 in a camera coordinate system in the captured image into a position in a space coordinate system in a reality space on the basis of the attitude and position of the HMD 100. Note that any known technology is available as a method for acquiring the position of the controller 120 on the basis of the captured image.

In step S1002, the control unit 211 acquires the attitude of the controller 120 on the basis of inertial information (for example, information on the inclination of the controller 120) acquired by the movement detection unit 224. Then, the control unit 211 displays a ray in a combined image on the HMD 100 (the image display unit 203) on the basis of the position of the controller 120 acquired in step S1001 and the attitude of the controller 120.

In step S1003, the control unit 211 determines whether the controller 120 is included in the imaging range of the imaging unit 202 (whether the controller 120 is detectable from the captured image). Here, when the processing proceeds from step S1002 to step S1003, the control unit 211 determines whether the controller 120 is included in the imaging range after a predetermined time (a short time like 1/60 seconds or so) elapses since the end of the processing of step S1002. When it is determined that the controller 120 is included in the imaging range of the imaging unit 202, the processing proceeds to step S1004. When it is determined that the controller 120 is not included in the imaging range of the imaging unit 202, the processing proceeds to step S1005.

Note that the expression "the controller 120 is not included in the imaging range of the imaging unit 202" includes a case in which another object exists between the controller 120 and the imaging unit 202 and the controller 120 is not seen from the imaging unit 202. For example, the expression "the controller 120 is not included in the imaging range of the imaging unit 202" also refers to a case in which the controller 120 is covered with a hand or hidden behind the clothing of a user, whereby the controller 120 is not detectable from the captured image.

The control unit 211 determines whether the controller 120 is included in the imaging range in step S1003 since there is a possibility that the controller 120 deviates from the imaging range with time. For example, the user moves the controller 120 at the time of controlling the ray. Therefore, even if the controller 120 exists inside the imaging range of the imaging unit 202 at a certain time, the controller 120 may move to the outside of the imaging range. Further, when the user to which the HMD 100 is attached turns his/her head even if the controller 120 does not move, the position or attitude of the imaging unit 202 changes. As a result, the controller 120 may be positioned outside the imaging range of the imaging unit 202.

In step S1004, the control unit 211 detects the controller 120 from the captured image. Then, the control unit 211 acquires the position of the controller 120 on the basis of a detection result from the captured image and the inertial information (the detection result of the movement detection unit 224). The control unit 211 is capable of acquiring the position of the controller 120 only from the captured image as in step S1001. However, in a case in which the focus of the imaging unit 202 was not adjusted or a light amount was insufficient in the photographing of the imaging unit 202, accuracy in detecting the position of the controller 120 based on the captured image may reduce. In consideration of such a case, the control unit 211 improves accuracy in detecting the position of the controller 120 by subsidiarily using the inertial information in combination. For example, the control unit 211 places weight on the coordinates of the position of the controller 120 acquired on the basis of the captured image as in step S1001 and the coordinates of the position of the controller 120 acquired on the basis of the inertial information as in step S1005 as will be described later and combines the weighted coordinates together. Then, the control unit 211 acquires a position shown by the combined coordinates as the position of the controller 120. Here, the control unit 211 may determine the weight in combining the coordinates together according to the state of the captured image (the blurred degree of the captured image, the brightness of the captured image, or the like). Thus, the control unit 211 is enabled to appropriately control to what degree the position of the controller 120 acquired on the basis of the inertial information is taken into consideration according to the accuracy in detecting the position of the controller 120 based on the captured image.

In step S1005, the control unit 211 detects the position of the controller 120 on the basis of the position of the controller 120 detected in the past and the inertial information (the result of the movement detection unit 224) since the controller 120 is not detected from the captured image. The detailed processing of step S1005 will be described later.

In step S1006, the control unit 211 moves (displays) the ray on the image display unit 203 (the HMD 100) on the basis of the position and attitude of the controller 120 like step S1002. That is, the control unit 211 updates the display of the ray.

In step S1007, the control unit 211 determines whether to end the ray display mode. The control unit 211 determines whether to end the ray display mode according to whether the user has performed an operation to change the ray display mode. When it is determined that the ray display mode is ended, the processing proceeds to step S1008. When it is determined that the ray display mode is not ended, the processing returns to step S1003.

In step S1008, the control unit 211 deletes the display of the ray from the combined image (hides the ray).

Detailed Processing of Step S1005

Processing for detecting the position of the controller 120 on the basis of inertial information (the detection result of the movement detection unit 224) by the control unit 211 in step S1005 will be described in detail.

Here, it is assumed that the time at which the controller 120 was no longer included in the imaging range (at which the imaging unit 202 was no longer enabled to detect the controller 120) is t1 and the position of the controller 120 at the time t1 is a position A1. Further, it is assumed that the time immediately before the time t1 is time t0 and the position of the controller 120 at the time t0 is a position A0. Here, the time t0 immediately before the time t1 is the time at which the controller 120 was included in the imaging range, and is, for example, the most recent time at which the processing of step S1004 was performed.

At the time t1, the control unit 211 has already acquired the position A0 of the controller 120 at the time t0. Therefore, the control unit 211 acquires the position A1 on the basis of information on the position A0. Specifically, the control unit 211 acquires the movement amount of the controller 120 from the time t0 to the time t1 from the movement detection unit 224 (the controller 120). Then, the control unit 211 acquires a position at which the controller 120 has been moved from coordinates A0 by the movement amount as the position A1 of the controller 120.

Note that the control unit 211 acquires, when the controller 120 is not included in the imaging range at a next time t2 as well, the position of the controller 120 at the time t2 on the basis of the movement amount of the controller 120 from the time t1 to the time t2. The processing is repeatedly performed when the controller 120 is not included in the imaging range.

Further, the movement detection unit 224 may be enabled to directly detect the movement amount of the position of the controller 120, or may be enabled to directly detect only the movement speed or movement acceleration of the position of the controller 120. When acquiring the movement speed, the movement detection unit 224 is enabled to integrate the speed to calculate a movement amount. When acquiring the movement acceleration, the movement detection unit 224 is enabled to integrate the acceleration twice to calculate a movement amount.

Display of HMD

Figure 4:
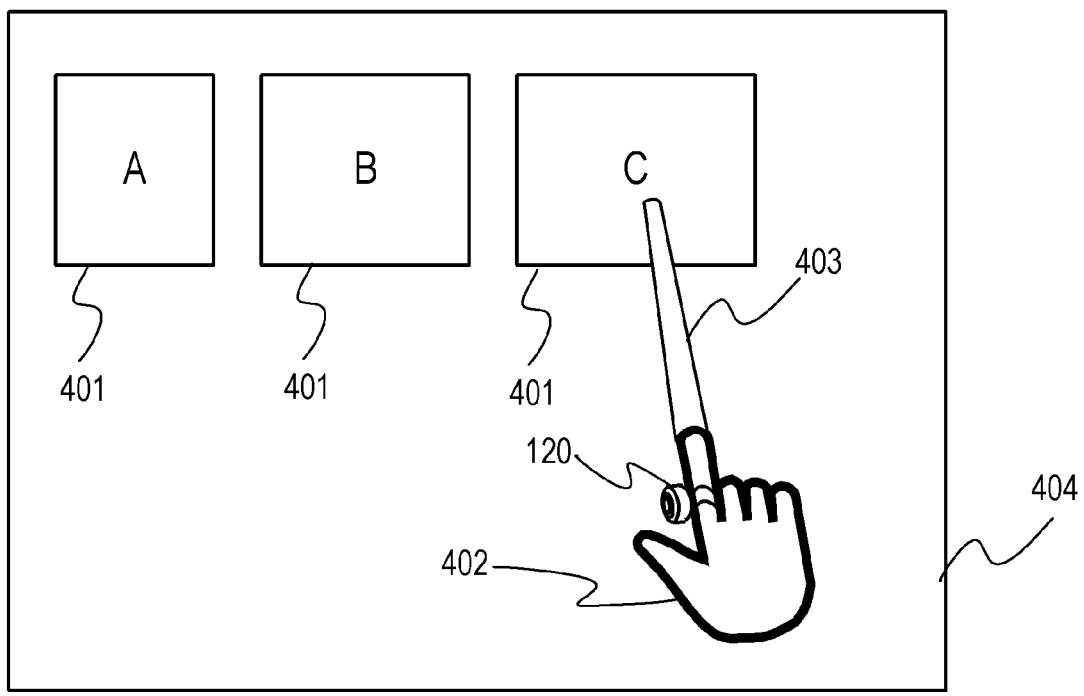
FIG. 4 is a diagram showing a display example of the HMD according to the first embodiment.
Figure 5:
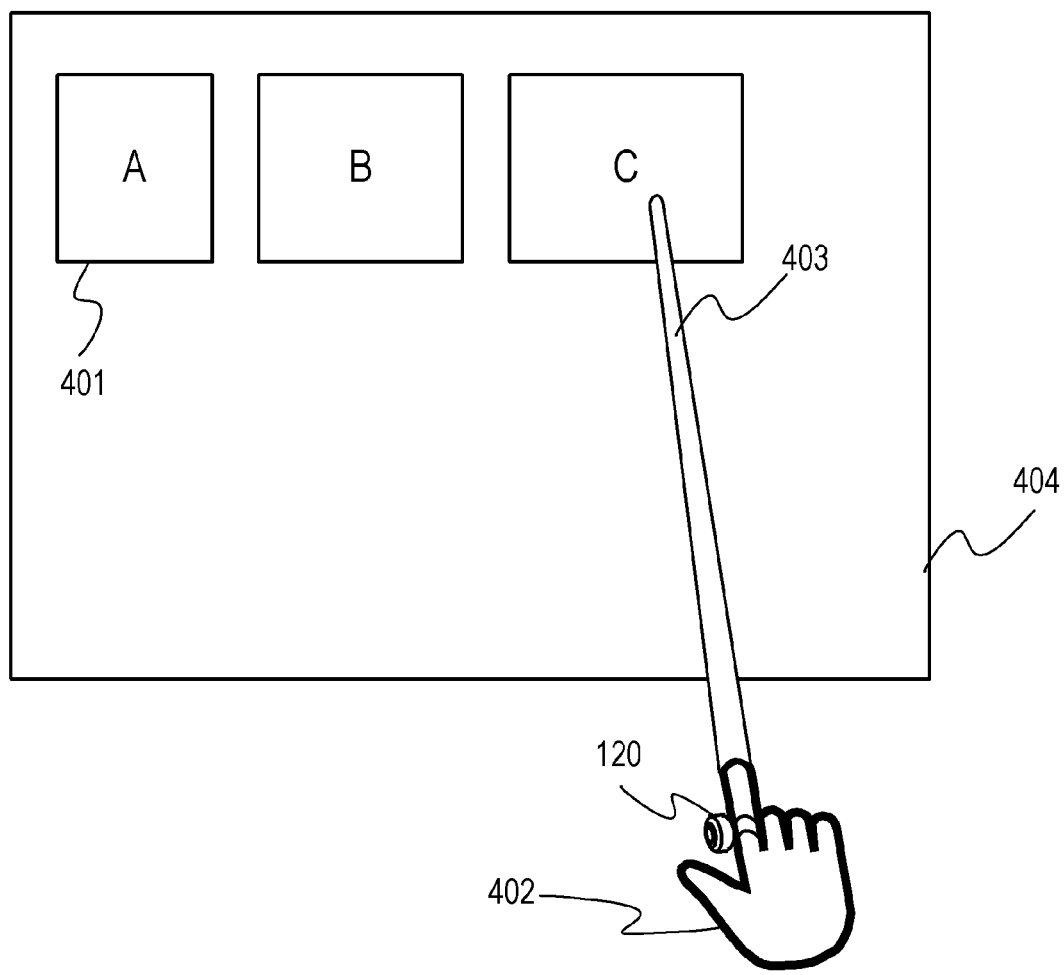
FIG. 5 is a diagram showing a display example of the HMD according to the first embodiment.
Figure 6:
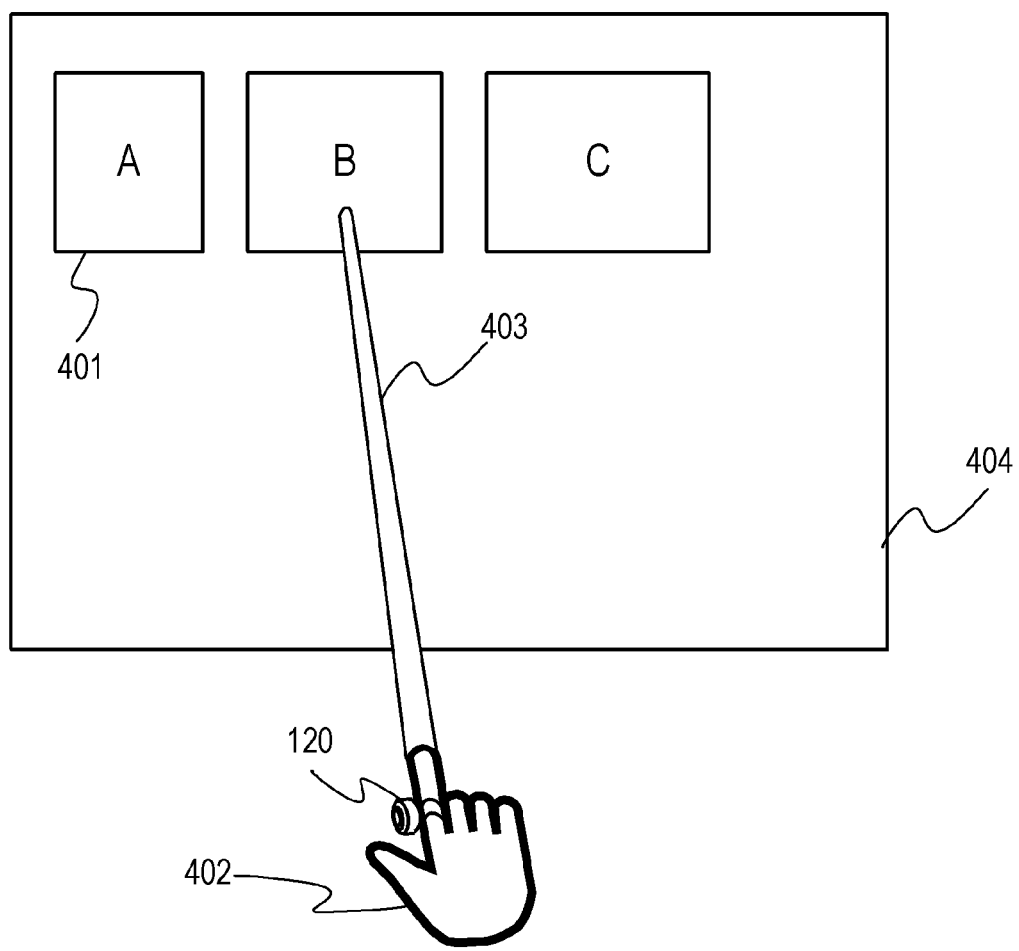
FIG. 6 is a diagram showing a display example of the HMD according to the first embodiment.

With reference to FIGS. 4 to 6, display examples of the HMD 100 according to the first embodiment will be described. FIG. 4 shows a first display example of the HMD 100. FIG. 4 shows a display example of a case in which the imaging unit 202 is enabled to capture (detect) an image of the controller 120 (a case in which the controller 120 is reflected in a captured image). The controller 120 is attached to a finger of the hand 402 of a user.

The controller 120 and the hand 402 of the user are included in the imaging range of the imaging unit 202. Therefore, the controller 120 and the hand 402 of the user are displayed in a display region 404 (combined image) of the image display unit 203.

In FIG. 4, the plurality of windows 401 are displayed so as to float in a space in the combined image (display region 404). The plurality of windows 401 include the three windows of a window A, a window B, and a window C. For example, when the window A is selected, an Internet browser operates and a specific search result is displayed. When the window B is selected, an application with which it is possible to generate a document operates. When the window C is selected, an application for moving images or a music player operates, which enables the user to listen to music or the like.

Further, the ray 403 extending from an index finger is displayed as a CG in a direction indicated by the index finger. The user is enabled to control the direction of the ray by moving the controller 120. Specifically, after the movement detection unit 224 has detected the attitude of the controller 120, the control unit 211 controls the direction of the ray 403 of the CG on the basis of the detected result.

Note that the ray 403 extends with the tip end of the controller 120 or a finger to which the controller 120 is attached as a reference point (irradiation origin). The control unit 211 detects the position of the controller 120 on the basis of a captured image and inertial information and sets the reference point of the ray 403. The user is enabled to select a window by moving the tip end of the ray 403. For example, the user is enabled to select the window A by causing a state in which the tip end of the ray 403 overlaps the window A to continue for a predetermined time.

FIG. 5 shows a second display example of the HMD 100. FIG. 5 shows a display example of a case in which the controller 120 exists outside the imaging range of the imaging unit 220 of the HMD 100. In this case, the controller 120 and the hand 402 of the user are not displayed in the display region 404 of the HMD 100. FIG. 5 shows a state in which the controller 120 and the hand 402 of the user exist outside (at the lower part) of the display region 404. In this case as well, the position of the controller 120 is acquirable in step S1005. Therefore, the ray 403 extends toward the window C from a reference point outside the display region 404.

FIG. 6 shows a third display example of the HMD 100. FIG. 6 is another example of the case in which the controller 120 exists outside the imaging range of the imaging unit 220 of the HMD 100. Here, the controller 120 has spatially moved leftwards from the state of FIG. 5, and the ray 403 indicates the window B. Outside (at the lower part) of the display region 404, the controller 120 and the hand 402 of the user exist. The controller 120 and the hand 402 of the user have moved leftwards from the state of FIG. 5. The imaging unit 220 does not capture (detect) an image of the controller 120, but the control unit 211 detects a state in which the controller 120 has moved leftwards with the movement detection unit 224. Therefore, the control unit 211 is enabled to reflect the movement of the position of the controller 120 in the display of the ray.

According to the first embodiment, the control unit 211 is capable of accurately detecting (acquiring) the position of the controller 120 with the movement detection unit 224 even if the controller 120 exists outside the imaging range of the imaging unit 202 of the HMD 100. Therefore, the HMD 100 is enabled to display the ray 403 at a more accurate position. Further, since the controller 120 does not require the provision of a sensor or the like other than the inertial sensor, the miniaturization of the controller 120 is made possible.

Modified Example 1

A modified example 1 will describe the operation of the information processing system 1 assuming a case in which the movement detection unit 224 is a unit that causes a large error in detecting inertial information.

When the movement detection unit 224 is, for example, an IMU, slight noise is caused in detected inertial information even if the controller 120 is made completely stationary. Therefore, the inertial information indicating that the movement detection unit 224 operates according to the noise is erroneously transmitted to the control unit 211. The noise is negligible if the noise is caused only for an extremely short time. However, when the noise is accumulated for a long time, the amount of the noise increases to a non-negligible level. Therefore, the actual position of the controller 120 deviates from the reference position of the ray 403 controlled on the basis of the inertial information as in, for example, FIG. 7.

Figure 7:
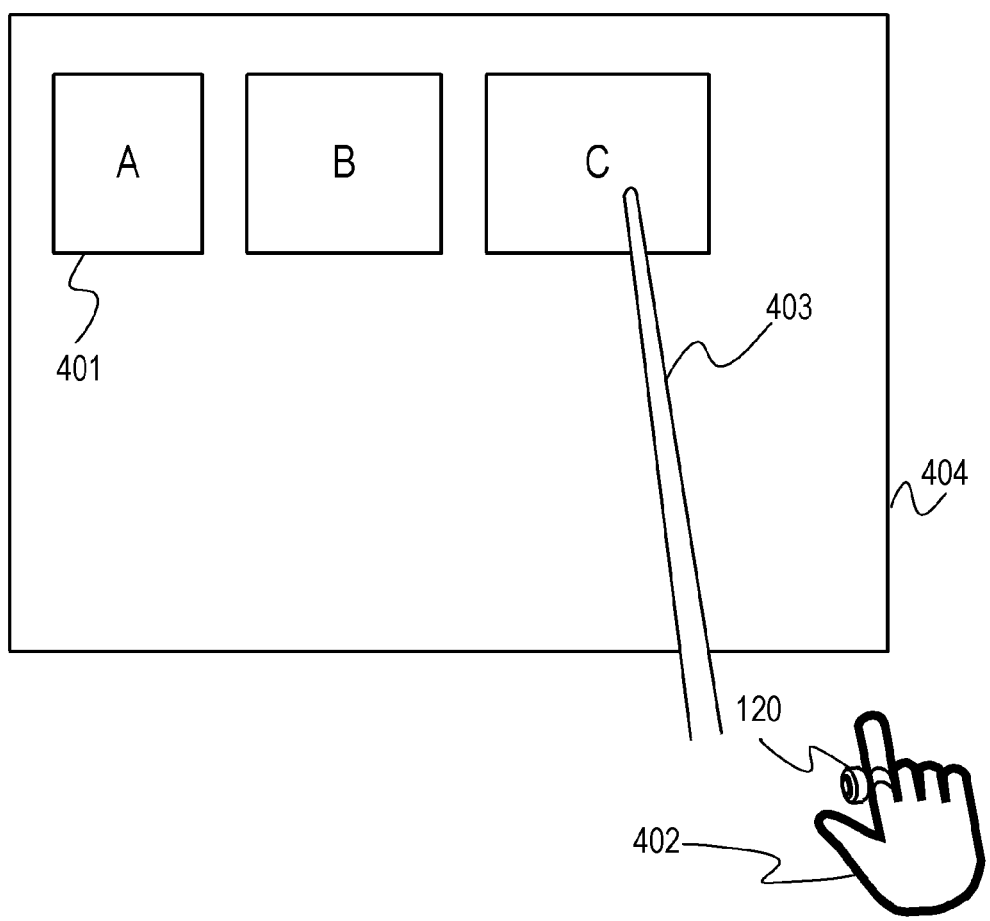
FIG. 7 is a diagram showing a display example of the HMD according to a modified example 1.

FIG. 7 shows a fourth display example of the HMD 100 according to the modified example 1. FIG. 7 is a diagram showing the positional relationship between the display region 404 and the controller 120 after a threshold time has elapsed with the continuation of a state in which the controller 120 exists outside the imaging range of the imaging unit 202 of the HMD 100.

In order to prevent such a deviation, the control unit 211 stops "acquiring the position of the controller 120 on the basis of the position of the controller 120 acquired in the past and inertial information" after a threshold time has elapsed since the last execution of the processing of step S1004 in the modified example 1. Specifically, when the controller 120 is not included in the imaging range (when the controller 120 is not detected from a captured image), the control unit 211 determines whether the threshold time has elapsed since the time at which the controller 120 was no longer included in the imaging range. Then, when the threshold time has elapsed since the time, the control unit 211 stops "acquiring the position of the controller 120 on the basis of the position of the controller 120 acquired in the past and the inertial information" (stops position acquisition based on the inertial information).

After stopping the position acquisition based on the inertial information, the control unit 211 acquires the position of the controller 120 acquired at the time point at which the position acquisition based on the inertial information has stopped (when the threshold time has elapsed) as the current position of the controller 120 in step S1005. Then, the control unit 211 displays the ray 403 on the image display unit 203 on the basis of the acquired current position of the controller 120. Alternatively, the control unit 211 acquires a position determined in advance (predetermined position) as the current position of the controller 120 and performs the display (position specification display) of the ray 403 or a pointer on the image display unit 203 with the acquired position as a reference.

When a state in which the controller 120 exists outside the imaging range of the imaging unit 202 continues longer (than the threshold time), a possibility that the controller 120 continues to move at all times is low and a possibility that the controller 120 remains at a fixed position outside the imaging range is high. This is because there is a high possibility that the controller 120 returns to the inside of the imaging range if the controller 120 continues to move. When the state in which the controller 120 exists outside the imaging range continues, a case in which the controller 120 is operated inside a pocket of the clothing of a user, a case in which the user holds the controller 120 under an arm with a hand relaxed, or the like is assumed. Therefore, in this case, the error between a reference position and the actual position of the hand reduces largely when the reference position of the ray is caused to remain at a fixed place rather than when the reference position of the ray moves on the basis of inertial information acquired by the movement detection unit 224. Further, when the error between the reference position and the actual position of the hand reduces, it is possible to reduce a sense of discomfort felt by the user during an operation. The fixed place is not limited to the position of the controller 120 at the time point at which position acquisition based on inertial information has stopped as described above but may be a position determined in advance. For example, the user may register a position at which the user is enabled to easily hold the controller 120 as a fixed place in advance.

Note that the control unit 211 may change the threshold time according to the temperature of the movement detection unit 224 (IMU) at the time point at which the controller 120 was no longer included in the detection range (at the time point at which the controller 120 was no longer detected). Here, the amount of noise caused in the movement detection unit 224 is different according to the temperature of the movement detection unit 224. Therefore, the control unit 211 measures the amount of noise for each temperature of the movement detection unit 224 in advance. When the current temperature of the movement detection unit 224 is a temperature at which noise is easily caused, the control unit 211 shortens the threshold time. Thus, it is possible to reduce the error between the reference position and the actual position of the hand. Note that the control unit 211 may control the threshold time according to air pressure at the time point at which the controller 120 was no longer included in the detection range rather than the temperature of the movement detection unit 224 (IMU). That is, the control unit 211 may control the threshold time according to any environmental information that possibly has influence on inertial information.

Modified Example 2

Hereinafter, the operation of the information processing system 1 assuming a case in which the movement detection unit 224 is a unit that causes a large error in detecting inertial information will be described as another example different from the modified example 1.

Figure 8:
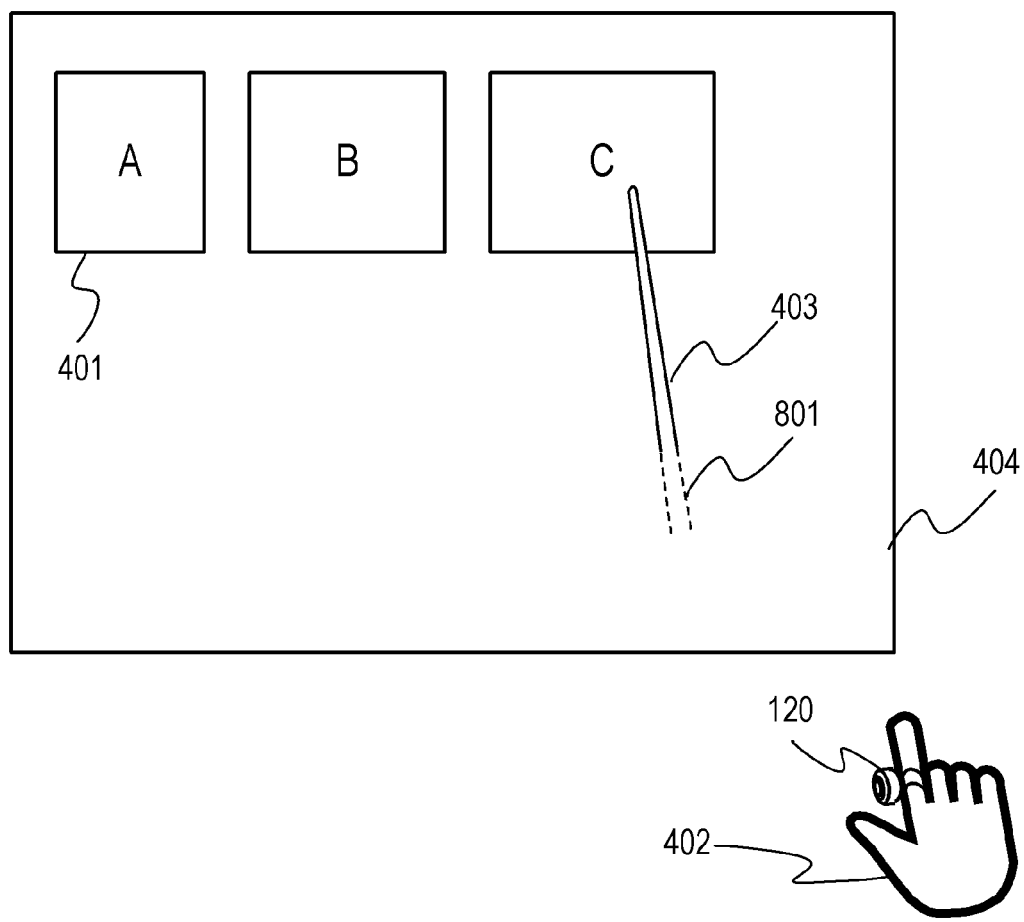
FIG. 8 is a diagram showing a display example of the HMD according to a modified example 2.

FIG. 8 shows a fifth display example of the HMD 100 according to a modified example 2. FIG. 8 is a diagram showing a display after a threshold time has elapsed with the continuation of a state in which the controller 120 exists outside the imaging range of the imaging unit 202 like FIG. 7.

In FIG. 8, a part 801 of the ray 403 near the controller 120 is made partially thin or blurred so as to blend with surroundings unlike FIG. 7. Further, the part 801 of the ray 403 near the controller 120 may not be originally displayed.

In FIG. 7 of the modified example 1, the ray is distinctly displayed up to the end of the display region, and therefore the difference between the position of the controller 120 and the reference point of the ray is made distinct. In the modified example 2, the control unit 211 changes the display of a part of the ray near a reference point to be made hardly visible after the elapse of a threshold time as shown in FIG. 8. Thus, even if there is a difference between the position of the controller 120 and the reference point of the ray, the effect of making the difference inconspicuous is obtained. Thus, it is possible to reduce a sense of discomfort felt by a user during an operation. Note that the control unit 211 may change the display of the ray according to the elapse of the continuation time of a state in which the controller 120 exists outside the imaging range of the imaging unit 202. For example, the control unit 211 increases the transparency of the ray in proportion to the continuation time of the state in which the controller 120 exists outside the imaging range. Then, the control unit 211 makes the ray completely invisible (sets the transparency of the ray at 100%) when the continuation time of the state in which the controller 120 exists outside the imaging range reaches a predetermined time.

Note that the examples of displaying the ray on the basis of the position and attitude of the controller 120 are described in the embodiments and modified examples. However, other display items may be displayed. For example, the information processing system 1 may estimate a position indicated by a finger of a user on the basis of the position and attitude of the controller 120 and display a pointer or specific icon at the estimated position.

According to the present invention, it is possible to accurately acquire the position of the hand of a user on the basis of information on a controller even if the controller held by the hand of the user is small.

Further, in the above descriptions, "processing proceeds to step S1 when A is at least B, and proceeds to step S2 when A is smaller (lower) than B" may be read as "the processing proceeds to step S1 when A is larger (higher) than B, and proceeds to step S2 when A is not more than B." Conversely, "processing proceeds to step S1 when A is larger (higher) than B, and proceeds to step S2 when A is not more than B" may be read as "the processing proceeds to step S1 when A is at least B, and proceeds to S2 when A is smaller (lower) than B." Therefore, the expression "at least A" may be replaced with "equal to A or larger (higher, longer, or greater) than A," or may be read as or replaced with "larger (higher, longer, or greater) than A" so long as no contradiction arises. Meanwhile, the expression "not more than A" may be replaced with "equal to A or smaller (lower, shorter, or less) than A," or may be replaced with or read as "smaller (lower, shorter, or less) than A." Further, "larger (higher, longer, greater) than A" may be read as "at least A," and "smaller (lower, shorter, or less) than A" may be read as "not more than A."

The present invention is described in detail above on the basis of the preferred embodiments but is not limited to the specific embodiments. The present invention also includes various other modes without departing from its gist. Some of the embodiments described above may be appropriately combined together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080032, filed on May 16, 2022, which is hereby incorporated by reference herein in its entirety.

What is claimed is:

1. An information processing device comprising:
a processor; and
a memory storing a program which, when executed by the processor, causes the information processing device to:
acquire inertial information from an inertial sensor provided in a controller;
detect the controller from a captured image acquired through imaging by an imaging device;
acquire a position of the controller on a basis of a position of the controller acquired in a past and the inertial information in a case where the controller is not detected from the captured image;
control a display to display a display item at a position based on the acquired position of the controller; and
stop reflecting the acquired position of the controller to a position of the display item in a case where a state where the controller is not detected from the captured image continues longer than a threshold time, the acquired position of the controller being a position on a basis of the position of the controller acquired in the past and the inertial information.

2. The information processing device according to claim 1, wherein
the control is performed to acquire the position of the controller on a basis of the inertial information and the captured image in a case where the controller is detected from the captured image.

3. The information processing device according to claim 1, wherein
the display item is light extending from a position based on the position of the controller acquired by the processor.

4. The information processing device according to claim 1, wherein
the display and the imaging device are provided in a head-mounted display attachable to a head of a user.

5. The information processing device according to claim 1, wherein
the control is performed to control the display to change a display of a part of the display item in the case where the state where the controller is not detected from the captured image, continues longer than the threshold time.

6. The information processing device according to claim 1, wherein the control is performed to stop acquisition of the position of the controller based on the position of the controller acquired in a past and the inertial information in the case where the state where the controller is not detected from the captured image continues longer than the threshold time.

7. The information processing device according to claim 6, wherein
the control is performed to acquire a predetermined position as a current position of the controller in the case where the state where the controller is not detected from the captured image continues longer than the threshold time.

8. The information processing device according to claim 6, wherein
in a case where a continuous time during which the controller is not detected from the captured image, is longer than the threshold time, the control is performed to acquire the position of the controller acquired at a time the continuous time reaches the threshold time as a current position of the controller.

9. The information processing device according to claim 5, wherein
the control is performed to control the threshold time according to a temperature of the controller in a case where the controller is not detected from the captured image.

10. The information processing device according to claim 1, wherein
the controller is a ring-shaped controller attachable to a finger of a user.

11. An information processing system comprising:
the information processing device according to claim 1;
a controller having the inertial sensor that acquires the inertial information; and
a head-mounted display having the imaging device.

12. An information processing method comprising:
acquiring inertial information from an inertial sensor provided in a controller,
detecting the controller from a captured image acquired through imaging by an imaging device;
acquiring a position of the controller on a basis of a position of the controller acquired in a past and the inertial information in a case where the controller is not detected from the captured image;
controlling a display to display a display item at a position based on the acquired position of the controller; and
stopping reflecting the acquired position of the controller to a position of the display item in a case where a state where the controller is not detected from the captured image continues longer than a threshold time, the acquired position of the controller being a position on a basis of the position of the controller acquired in the past and the inertial information.

13. A non-transitory computer readable medium that stores a program, wherein the program causes a computer to execute an information processing method,
the information processing method comprising:
acquiring inertial information from an inertial sensor provided in a controller;
detecting the controller from a captured image acquired through imaging by an imaging device; and
acquiring a position of the controller on a basis of a position of the controller acquired in a past and the inertial information in a case where the controller is not detected from the captured image,
controlling a display to display a display item at a position based on the acquired position of the controller, and
stopping reflecting the acquired position of the controller to a position of the display item in a case where a state where the controller is not detected from the captured image continues longer than a threshold time, the acquired position of the controller being a position on a basis of the position of the controller acquired in the past and the inertial information.

14. The information processing device according to claim 1, wherein
the display item is displayed at a position based on a predetermined position and the inertial information, in the case where the state where the controller is not detected from the captured image continues longer than the threshold time.

15. The information processing device according to claim 1, wherein
a ray is displayed at a position based on the inertial information in a state where a reference position of the display item is stayed at a predetermined position, in the case where the state where the controller is not detected from the captured image continues longer than the threshold time.

* * * * *